United States Patent [19]

Kuckes

[11] Patent Number: 4,529,939

[45] Date of Patent: Jul. 16, 1985

[54] SYSTEM LOCATED IN DRILL STRING FOR WELL LOGGING WHILE DRILLING

[76] Inventor: Arthur F. Kuckes, 103 Spring La., Ithaca, N.Y. 14850

[21] Appl. No.: 456,646

[22] Filed: Jan. 10, 1983

[51] Int. Cl.³ .......................... G01V 3/24; G01V 3/26; E21B 47/00; E21B 49/00
[52] U.S. Cl. ................................. 324/346; 166/250; 175/50; 324/369
[58] Field of Search .............. 324/323, 346, 347, 356, 324/359, 366, 368, 369; 166/65 M, 250, 254, 255; 175/40, 50

[56] References Cited

U.S. PATENT DOCUMENTS

| | | | |
|---|---|---|---|
| 2,196,314 | 4/1940 | Lee | 324/346 |
| 2,262,419 | 11/1941 | Athy et al. | 324/346 X |
| 2,291,692 | 8/1942 | Cloud | 324/359 X |
| 2,359,894 | 10/1944 | Brown et al. | 324/359 X |
| 2,414,194 | 1/1947 | Ennis | 324/368 |
| 2,569,390 | 9/1951 | Sewell | 324/356 X |
| 4,323,848 | 4/1982 | Kuckes | 324/346 X |

Primary Examiner—Gerard R. Strecker
Attorney, Agent, or Firm—Jones, Tullar & Cooper

[57] ABSTRACT

Logging apparatus for measuring magnetic fields while drilling is disclosed. An electrode is located within a drill string and receives alternating current which is conducted to the drill string and from the drill string is injected into the earth surrounding the well. This current is concentrated in anomalies of interest, such as the casing of a target well which is to be intercepted by, or to be avoided by, the well being drilled. A sensitive magnetometer is located within a nonmagnetic portion of the drill string, near the bottom thereof, to detect the alternating magnetic field generated by the current flow in the target and to produce output signals corresponding to the detected field. The output from the magnetometer is used to determine the relative locations of the well being drilled and the target.

23 Claims, 4 Drawing Figures

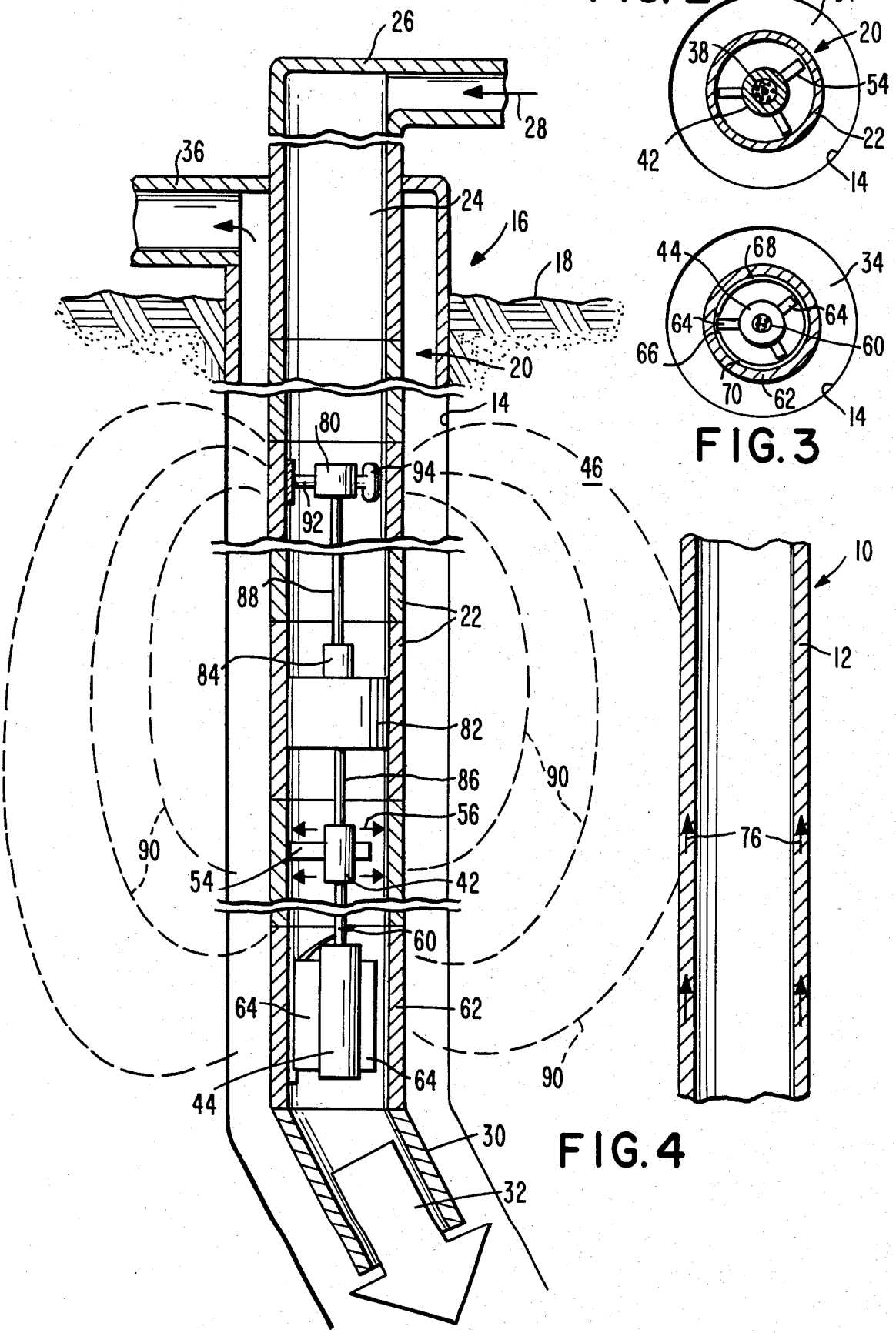

SYSTEM LOCATED IN DRILL STRING FOR WELL LOGGING WHILE DRILLING

BACKGROUND OF THE INVENTION

The present invention relates, in general, to a method and apparatus for injecting electrical current into the earth surrounding a well and for detecting and measuring magnetic fields produced by such currents during drilling of the well. More particularly, the invention relates to a system for injecting alternating currents into the earth and for measuring magnetic fields produced by current flow in nearby anomalies such as cased wells, geological formations, and the like to determine the distance and direction to such anomalies, such measurements being accomplished from within a drill string so that removal of the drill string from the well for logging purposes is not required.

In deep well drilling, where wells are commonly drilled to depths in excess of 12,000 ft., it is extremely difficult to track with accuracy the path followed by the drill, since even a very minor deviation in direction can, after several thousand feet of drilling, produce a huge divergence between the actual and intended locations. Because of variations in geologic formations, the high temperatures encountered, and the generally unfavorable conditions which exist in the environment of a deep well, accurate tracking of a well during the course of drilling is extremely difficult. Although numerous techniques have been developed for making such measurements, none have been found to be entirely satisfactory.

Although an accurate determination of well location is always desirable, such information becomes particularly critical in two related situations: first, when an attempt is being made to locate and intercept a well, and second, when an attempt is being made to avoid another well known to be located in the general area being drilled. The first situation may occur, for example, when an existing well blows out and it becomes necessary to drill a relief well that will intersect the first, or target, well at a location below the blowout. The relief well must be started a long distance from the target well head, for example as much as two miles away, and must angle down to intersect the target well at a depth of, for example, 10,000 to 15,000 feet. Although the initial part of the drilling can be done using existing directional equipment, a problem arises when the relief well nears the target well, since accurate information about the relative locations of the two wells has not been available in the prior art. Not only must the measurements be made at locations which are thousands of feet below the surface of the earth, but in addition the same problems of tracking existed when the target well was drilled as when the relief well is being drilled. As a result, only a slight deviation from the assumed location and direction of the relief well can result in premature intersection with the target well or can cause the relief well to miss the target well entirely.

The second situation noted above occurs, for example, when several wells are being drilled from a single location, as when a large number of wells are being drilled from an off-shore platform, and later wells must be directed so as to avoid earlier-drilled wells. More particularly, the problem arises when it is desired to add a well between existing wells while avoiding intersecting the existing wells. This occurs, for example, were some of the early drilling from off-shore drilling platforms located well heads at 12 foot intervals, with the wells themselves being directed away from each other in various directions. In order to increase the oil production from such a drilling platform, it may become desirable to drill new wells between the existing wells; that is, at 6 foot intervals, so as to increase the number of wells served by the platform. However, it is essential that the new wells avoid the existing wells, and great care must be taken to monitor the direction of drilling.

Another problem which is encountered in deep well drilling is the unexpected crossing of the interface between different geological strata into a stratum which may contain, for example, gases at very high pressure which can damage the drilling equipment. In order to avoid such occurrences and in order to determine the nature of the strata through the drill is travelling, periodic logging of the well is required.

It is known that the magnetic and electrical characteristics of the geological formations surrounding a well being drilled, which characteristics reflect the presence of anomalies such as variations in the strata or the existence of a target well casing, can be measured by means of highly sensitive magnetometer systems. In such systems, for example, electrical currents are caused to flow in the strata surrounding the well, the current flow creating a magnetic field that can be measured. The injected currents do not flow uniformly through the strata, but may be concentrated in conductive anomalies such as the metal casing of a target well, thereby creating a detectable variation in the magnetic field. Such a system is disclosed in U.S. application Ser. No. 203,912, filed Nov. 4, 1980, now U.S. Pat. No. 4,372,398 entitled "Method of Determing the Location of a Deep-Well Casing by Magnetic Field Sensing", of Arthur F. Kuckes. This application discloses a method for injecting current and measuring the resultant magnetic field utilizing a highly sensitive magnetic field sensor such as that shown in U.S. Pat. No. 4,323,848, issued April 6, 1982.

Although such prior systems have been effective, a difficulty has been encountered because of the fact that they cannot provide measurement during the actual drilling of the relief well. Such systems require the periodic removal of the drill string and insertion of the measuring equipment to allow logging measurement to be made. Because of the extreme depth of such wells, the removal of a drill string is extremely expensive, and results in a large amount of lost drilling time. Such lost time is particularly critical when an attempt is being made to intercept and shut down a blown out well. Furthermore, on occasion the logging equipment itself becomes stuck in the relief well, further delaying drilling and increasing costs while attempts are made to free it. Since logging measurements must be made more and more often as the relief well approaches the target well the costs and time delays involved become considerable.

SUMMARY OF THE INVENTION

It is an object of the present invention to provide a system for making logging measurements in a well being drilled without removing the drill string from the well.

It is another object of the present invention to provide a method and apparatus for measuring while drilling the magnetic fields produced by current flow in anomalies in the vicinity of the well being drilled.

Still another object of the present invention is the provision of a method and apparatus for injecting alternating current into the earth surrounding a well being drill and detecting, by means of the magnetic fields produced by such alternating current, the direction and distance of anomalies in the surrounding strata.

It is another object of the present invention to provide a system for determining the direction and distance of a cased well by measuring the magnetic field produced by electric currents flowing in that well.

It is another object of the present invention to provide within a drill string, apparatus for injecting alternating current into the earth surrounding a well being drilled and for providing within the same drill string a highly sensitive magnetic field detector for measuring the magnetic fields produced by that current.

Another object of the invention is to provide a system for injecting alternating current into strata surrounding a well being drilled to produce a current flow in the casing of a nearby well, which current results in a measurable magnetic field, the system further including a magnetic field sensor within the drill string of the well being drilled for measuring the field to determine the distance and direction of the casing, the measurement being made without withdrawing the drill string from the well.

Another object of the present invention is to provide a self-contained well logging device within a drill string section for injecting current into the earth surrounding a well being drilled, measuring magnetic fields produced by the injecting current, and communicating the measured quantities to the surface well head to provide data for use in controlling further drilling of the well.

Briefly, the present invention includes magnetic field producing and measuring apparatus locatable within a conventional deep well drill string which is constructed of a multiplicity of conventional drill pipe sections. The bottom-most section of the drill string carries a conventional dynamotor drill bit which may be incorporated in a bent subsection for directional drilling, or in other conventional drill string subsections. The drill string is adapted to supply drilling mud under high pressure through the drill string and through a conventioanl turbine arrangement in the bent subsection to drive the drill bit. In conventional manner, the mud then flows out of the drill string and back up the drilled well bore, outside the wall of the drill string, to return to the surface. The drill string is assembled and lowered into the well during drilling by means of a suitable derrick, or the like, located at the well head to support the drill string. Drill pipe sections are added to the drill string as the depth of the well increases, with the drill string being suspended from suitable support equipment in the derrick in known manner.

The well logging apparatus of the present invention is suspended within the central passageway of the drill string and is supported near the bottom of the drill string, just above the subsection which carries the drill bit. The logging apparatus may be held in place in the drill string by means of a suitable support cable extending the full length of the drill string, or may be an independent unit secured in the bottom section of the drill string. In either event, the logging apparatus consists of an alternating current emitting electrode located in the drill string bore and a magnetic field sensor located a predetermined distance below the electrode.

In a conventional drill string, each drill pipe subsection, or collar, is approximately 30 feet in length, with three subsections making up a full section. In accordance with conventional drilling techniques, the lower-most sections making up about 300 feet of pipe, may weigh from 100 to 150 pounds per foot. An intermediate portion of the drill stem, perhaps the next 600 feet, is conventionally constructed of pipe in the range of 28 pounds per foot, with the remainder of the drill stem being constructed of drill pipe having a weight of 15 pounds per foot. The heavy weight of the lower pipe sections is not only for strength, but also serves to put weight on the drill bit. At the very bottom of the drill string is a modified collar, or sub, which carries the drill bit. The bit may either be vertical, for straight drilling, or may be angled with respect to the axis of the drill string for directional drilling (i.e., in a "bent" sub), the string being rotated from the surface to cause the drill to advance in the desired direction.

In accordance with the present invention, the drill string collar immediately above the drill bit sub is a sensor collar constructed of a non-magnetic high resistivity material such as stainless steel or Monel. This sensor collar is adapted to receive a highly sensitive magnetic field sensor tool which is oriented within the sensor collar by means of a detent or the like. This detent assures a fixed angular relationship between the sensor and the drill string so that when a bent sub is utilized, its direction of travel can be accurately determined by the sensor.

In order to minimize the effect of magnetic fields produced by current flow in the sensor collar itself, the magnetic field sensing tool is held in coaxial relationship with the drill string by means of suitable spacers. Furthermore, the sensor collar is carefully constructed to insure that its inner and outer surfaces are concentric so that any current flow that does occur is equalized around the circumference of the collar, thereby insuring that any stray magnetic fields created in the drilling bore by such a current are essentially cancelled at the axis of the drill string, so that they have minimal or no effect on the field sensor tool.

Current is injected into the earth surrounding the well by means of an electrode located within the central bore of the drill string and spaced above the field sensor by a distance sufficient to insure that the current flow within the drill string itself is not sufficient to adversely affect the desired field readings. The electrode is preferably mounted within the drill string approximately 70 to 150 feet above the field sensor tool, although the electrode might be as close as 30 feet from the field sensor; generally speaking, however, the further away the electrode is from the sensor, the better. Since the electrical resistance of the drill pipe sections is sufficiently high to force current emitted by the electrode into the surrounding earth completely within a distance of about 200 feet, placing the electrode as much as 300 feet away from the field sensor would insure that essentially no current remains in the drill string itself in the area of the field sensor, and such an arrangement would be preferred in circumstances where the stray magnetic fields at the sensor tool are to be minimized. However, when operating within about 10 feet of a cased target well, the magnetic field resulting from current flow in the target is sufficiently strong that the electrode can be quite close to the field sensor without adverse effect from the stray fields produced by current in the drill string. The controlling factor in the size of the magnetic field to be detected.

The electrode preferably is located within a portion of the drill string which is constructed of a non-magnetic material such as stainless steel, since this material has a larger electromagnetic skin depth than does the steel used in conventional drill collars. Standard collars are more likely to confine the current flow to the interior surface of the collar, while stainless steel is more suited for the injection of current into the earth since it has a high resistance to electric current. Accordingly, in some embodiments of the invention, the lowermost 300 feet of the drill stem would be constructed of this material. The current injecting electrode is axially located within the drill stem and may be held coaxial by suitable spacers. In one embodiment of the invention, a second electrode is placed at the surface of the earth at a location spaced from the well head, and an alternating current source is connected across the two electrodes. Current flows from the drill string electrode through the drilling mud to the drill string itself, so that drill string sections in the vicinity of the electrode act as current radiators. The current flows generally outwardly from these drill string sections through the drilling mud outside the drill string and into the earth, flowing generally uniformly outwardly, to produce a symmetric flow of current through the earth toward the surface electrode. Some of the current flows through the drill string sections for at least some distance from the location of the emitting electrode before flowing into the surrounding earth. Although most of the current will flow upwardly, some will flow down and will reach the sensor collar if the sensor is located within about 200 feet of the electrode. However, since that collar is near the end of the drill string, the magnitude of that current will be very small even if the electrode is close to the sensor collar, any current flow in that collar will have little direct effect on the sensor tool.

In a second embodiment of the invention, both electrodes are located within the drill string with one being spaced above the other by about 300 feet. Such an arrangement has the advantage of eliminating the need for providing an electrical connection from the surface to the injecting electrodes, and thus permits a self-contained down-hole system to be constructed. In this modified version, the power supply for the electrode is a self-contained unit located within the drill string, utilizing either a mud-driven turbine or batteries.

The flow of current in the earth surrounding the drill string is affected by the geological strata and by any nearby structures such as a cased well. Whether the system is being used to locate and intercept a target well, as would be desired if that nearby well had blown out, or whether the system is being used to avoid a nearby working well, it is essential that the exact distance and direction to the nearby well be known with great accuracy. The casing of such a target well acts as an anomaly in the geologic strata and serves to concentrate the current injected into the earth by the injector electrode. The concentration of current in the target well casing produces a magnetic field which can be detected by the sensor within the drill string. It has been found that when the target well is within about ten feet of the well being drilled, and when sufficient current is injected to produce a current flow of about 50 milliamps in the target well casing, the magnetic field produced by the current flow in the casing exceeds the magnetic field produced by current flow within the drill string and surrounding earth by an amount sufficient to permit reliable and accurate measurement of that magnetic field, and consequently permits accurate calculation of the special relationahip between the well being drilled and the target casing.

BRIEF DESCRIPTION OF THE DRAWINGS

The foregiong and additional objects, features and advantages of the present invention will become apparent from a consideration of the following detailed description of preferred embodiments thereof, taken in conjunction with the accompanying drawings, in which:

FIG. 2 is a sectional view taken along line 2—2 of FIG. 1;

FIG. 3 is a sectional view taken along line 3—3 of FIG. 1; and

FIG. 4 is a partial sectional view of a modified form of the apparatus of FIG. 1.

DESCRIPTION OF PREFERRED EMBODIMENTS

Figure 1:
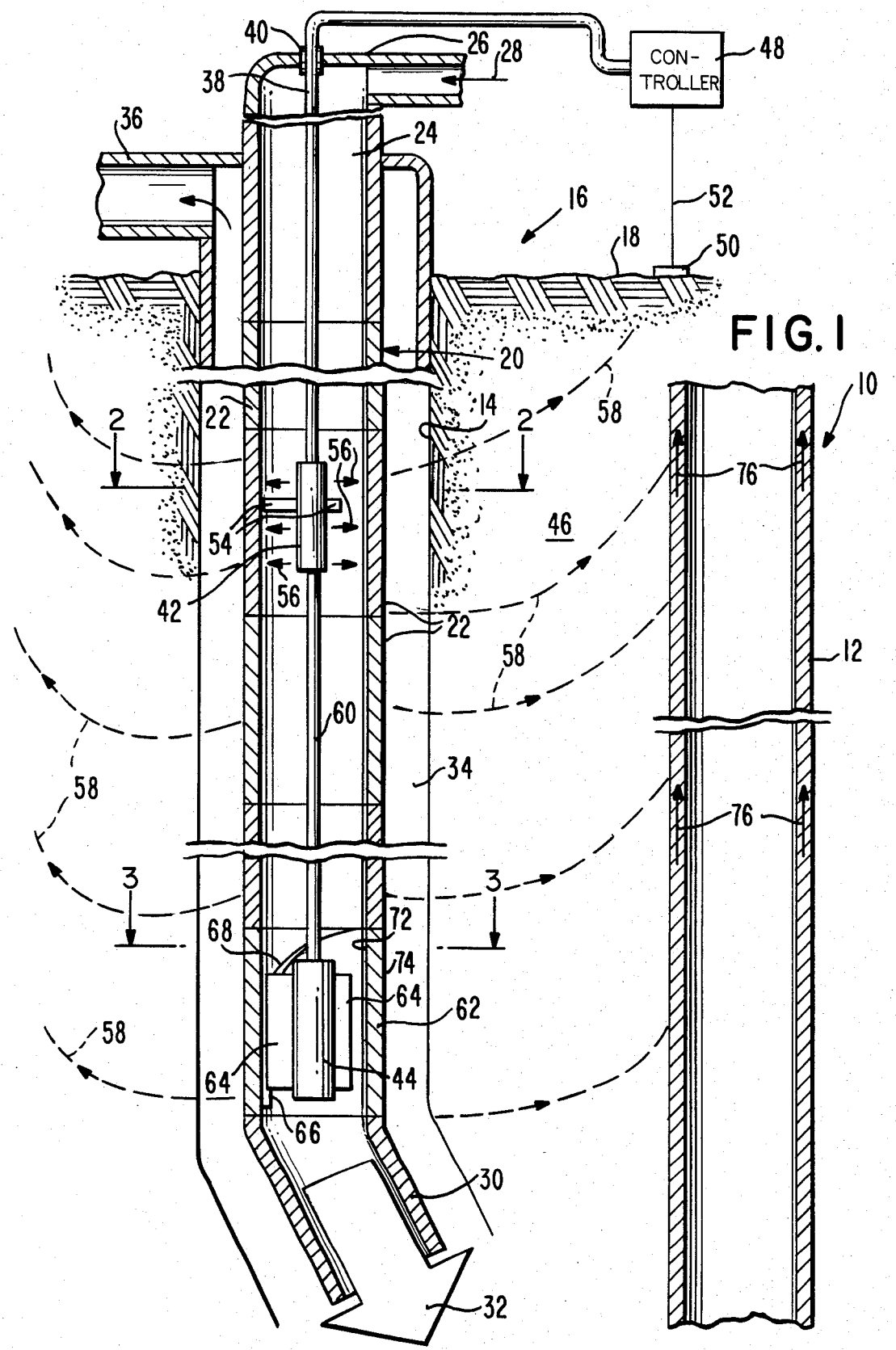
FIG. 1 is a partial sectional view of a target well and a relief well containing the current injection and field detection apparatus mounted within a drill string in accordance with the present invention.

Turning now to the illustration of FIG. 1, there is shown a target well 10 having a casing 12. The target well may be an abandoned or a producing oil or gas well which exists in a field and is to be avoided by a later well being drilled, or may be an existing well that has blown out, and is to be intercepted at a selected depth below the surface of the earth by a relief well. Alternatively, well 10 may represent some other anomaly located in the earth, such as an electrically conductive geological formation, a drill string in an uncased well, or some other material with a different electrical conductivity which may be a target for interception or avoidance. For purposes of this disclosure, such material will be referred to as the target well, or just the target.

Adjacent the target is a second well 14 which is being drilled, and which is to be directed so as either to intersect the target or to avoid it. For convenience, the well 14 will be referred to as a relief well, and the system and method of the invention will be described in terms of a relief well being drilled to intersect a target cased well at a desired depth below the surface of the earth.

Well 14 typically begins at a wellhead 16 at the surface 18 of the earth, spaced away from the wellhead (not shown) of well 10, the distance being as much as one or two miles in the case where well 10 has blown, but has not been capped. Suitable derricks and other conventional well drilling equipment (not shown) is located at the wellhead, by means of which a drill string 20 is supported in well 14 in known manner. At the wellhead 16 subsections or drill collars 22 are secured end to end and lowered into the well as drilling progresses, with drilling mud being supplied to the interior bore 24 of the string 20 by way of fitting 26, as indicated by arrow 28, again in conventional manner. It will be understood that this structure of the drill string and wellhead is shown only diagrammatically, since that structure is conventional and forms no part of the invention.

The bottom-most drill string subsection 30 carries the drill bit 32, as diagrammatically illustrated. The drill bit subsection 30 may be a bent sub, as shown, which angles the drill bit with respect to the axis of the drill string to permit changes in the direction of the well, or may be a straight section for straight-ahead drilling. With the use of a bent sub, the direction of drilling may be controlled by rotating the entire drill string from the wellhead, thereby turning the bent sub.

As is known, the drill bit may be driven by a motor which in turn is driven by the flow of drilling mud down the drill string bore. The mud flows out of the drill string at the bent sub, around the location of the drill bit, and flows up and out of the well 14 through the annular space 34 around the outside of the string 20, carrying the material loosened by the drill up and out of the well through outlet fitting 36.

Located within the drill string bore 24 is a wireline 38 which enters the top of the bore by way of a commercial wireline gland 40 and extends downwardly and is connected to a current injecting electrode 42 and a magnetic field sensor 44, both located in bore 24. The electrode is adapted to inject alternating current into the earth strata 46 surrounding the well, and the sensor 44 is adapted to detect magnetic fields produced by the current so injected. The electrode 42 is conventional, and electric current is supplied thereto from an alternating current source (not shown) in a controller 48 connected between a ground electrode 50 at the surface of the earth, by way of cable 52, and to the electrode 42 by way of wireline 38. Preferably, as shown in FIGS. 1 and 2 electrode 42 is axially aligned within the bore 24 by means of spacers 54 and if desired may be secured by the spacers to the interior surface of a subsection 22.

When alternating current is applied to electrode 42, the current tends to flow outwardly through the electrically conductive drilling mud in bore 24 into the drill string subsections 22. These subsections may be of conventional steel construction, but in the preferred forms of the invention the subsections 23 in the vicinity of the electrode are of a non-magnetic, relatively resistive metal such as stainless steel or Monel. These subsections near the electrode receive the current therefrom and in turn become a radiating electrode, directing the current radially outwardly through the drilling mud in the annular space 34 into the earth 46, where the current travels generally outwardly from the well and upwardly toward the surface and electrode 50. This current flow from the electrode 42 is indicated by the arrows 56 and 58.

Although the current from electrode 42 will flow both upwardly and downwardly in the collars 22, the electrical resistance of the steel is such that the current will tend to flow out of the drill string into the earth 46, and that within a distance of about 200 feet of the electrode, all of the current will be injected into the earth, and none will remain in the drill string. Stainless steel is preferred for the collars 22 near the electrode since the electromagnetic skin depth of stainless steel is longer than that of iron and the resistivity is higher, so the alternating current will flow more readily into the strata 46 than is the case with conventional steel subsection.

The magnetic field sensor 44 is located below the electrode 42 and is connected thereto by means of an insulated bridle cable 60 which includes electrical connecting lines by which the sensor receives power and transmits signals to the surface controller 48 along the wireline 38. The sensor 44 preferably is a highly sensitive magnetic field detector such as that described in U.S. Pat. No. 4,323,848 of Arthur F. Kuckes, the disclosure of which is hereby incorporated herein by reference.

The sensor 44 is located within the penultimate drill string collar 62, which will herein be referred to as the sensor section, or collar, and is aligned therein so as to assume a fixed rotational position with respect to the drill string. This alignment fixes the angular relationship between the sensor and the bent sub 30, so that the output signals from the sensor can be used to determine the direction in which the bent sub is facing relative to the target, and thus can be used to control the direction of drilling.

The sensor may be aligned within the sensor collar by means of radially extending spacers 64 which serve to engage a suitable detent, which may be in the form of a slot 66 formed by diverging shoulder portions 68 and 70 (see FIG. 3) adapted to receive one of the spacers. The shoulder portions guide a selected one of the spacers, which may be longer than the remaining spacers, into the slot 66 as the sensor is lowered into the sensor collar, and cause the sensor to rotate into a predetermined angular relationship with the sensor collar and with the bent sub. Since the electrode and sensor of the present invention remain within the drill string during the actual drilling operation, the sensor will ordinarily be aligned in the sensor collar at the surface, with the detent or slor arrangement insuring that the relationship between the sensor and the bent sub is known and remains constant during the drilling operation. The spacers 64 also serve to align the sensor with the axis of the drill string.

In order to permit the sensor to measure magnetic fields external to the drill string, the sensor collar 62 is fabricated from a nonmagnetic material such as stainless steel or Monel. Since the collar 62 may carry a small portion of the electric current produced in the drill string subsections by the electrode 42, and since that current will produce stray magnetic fields within the interior of the drill string that will adversely affect the sensor's ability to detect exterior magnetic fields, care should be taken to minimize such effects. This is accomplished by carefully selecting the collar 62 to insure that its inner and outer cylindrical walls 72 and 74, respectively, are concentric, so that the thickness of the collar wall is substantially constant throughout the circumference and height of the collar. Accordingly, the current flow will be equalized around the circumference of the collar, insuring an even distribution of the radial components of the stray magnetic field within the collar. This results in cancellation of the radial stray field components at the axis of the sensor collar, so that by locating the sensor at the axis, exterior magnetic fields can be accurately measured by the sensor substantially without interference from stray fields.

The distance between the electrode 42 and the sensor tool 44 can be varied, with the optimum distance depending upon the nature of the target, the distance to the target, the nature of the strata being traversed, and like variables. In general, the farther the sensor is spaced from the electrode, the better, since the greater the distance, the more likely it is that the current from the electrode will be injected into the earth, rather than flowing in the drill string. To minimize the stray fields produced by current flow in the drill string the electrode should be 300 feet above the sensor, and the entire drill string from the electrode to the sensor collar should be of stainless steel. This produces a high electrical resistance which insures that substantially all of the current flowing down the drill string from the electrode will be injected into the earth before reaching the sensor collar. Some stray currents may exist in the area of the sensor, but the stray field produced thereby would cancel each other at the sensor, as explained above. If standard steel collars are used, the stray currents in the sensor collar may be higher, but may be acceptable under some measuring conditions.

If the conditions are right, i.e., the relief well is within about 10 feet of the target, and the target is producing a strong magnetic field, it may be possible to reduce substantially the distance between the injecting electrode 42 and the sensor 44, perhaps to as little as 30 feet. In such a case, however, the stray fields within the bore 24 of the drill string will be quite high, and will affect the sensitivity of the sensor to externally generated magnetic fields.

Preferably, the electrode 42 will be located between about 70 feet and 150 feet above the location of the sensor 44. It is desirable to have the spacing less than about 90 feet, since a full section of the drill string, which comprises three 30-foot subsections, is the size which a conventional drilling rig is designed to handle. This allows the logging apparatus, comprising the electrode 42, bridle 60 and sensor 44, to be mounted in a single section of the drill string for ease of handling. However, in order to obtain better sensitivity and accuracy in measuring the external magnetic field, it may be desirable to separate the electrode and the sensor by about 150 feet.

When drilling a relief well, that well is initially directed toward the target using conventional methods. Because of the great distances involved in the drilling of deep wells, and because of the uncertainties in determining the location of both the target and the relief well, such conventional methods of location become prohibitively time consuming and expensive. The prior methods require periodic withdrawal of the drill string to allow logging tools to be lowered into the well, and as the relief well closes on the target, this must be done more and more frequently. The present invention avoids this problem by providing, within about ten feet of the target well, a continuous and accurate measurement of its distance and direction. The logging tool of the invention is located within the drill string and is operable during the actual drilling, although for greatest accuracy the actual drilling would be momentarily halted while measurements are made.

To operate the logging tool while it is mounted inside the drill string, alternating electric current is supplied to the electrode 42. Current flows through the drilling mud inside the drill string into the drill pipe subsections, so that the subsections become radiators of electrical current. This radiated current 58 flows through the return drilling mud in the annular space 34, and into the surrounding strata. Because of the conductivity of the steel subsections, the current is distributed around the circumference thereof and is, therefore, injected outwardly into the earth in a substantially uniform circumferential pattern.

The current flow in the earth tends to flow uniformly in the absence of any anomalies in the strata, but if such an anomaly exists, the current distribution will be disturbed. A uniform current flow will produce a substantially uniform external magnetic field around the relief well, and this field will be substantially out at the axis of the drill string, where the sensor 44 is located. However, perturbations in the current will unbalance the field, resulting in a measurable variation. If the anomaly is a steel casing 12 in a target well, then the injected current will collect in the target casing, resulting in a strong alternating current therein, indicated by arrows 76. The current concentrated in the target will produce a target magnetic field which can be detected by the a.c. field sensor in the drill string. Analysis of the measured field pattern provides information as to the direction of the anomaly, while measurement of its relative magnitude provides information as to the distance. This information may then be used to control conventional guidance equipment (not shown) to direct the drill bit 44, so that drilling can be continued in the desired direction.

Location of the logging tool inside the drill string allows measurement while drilling, and provides a significant savings in time and money. Construction of the drill string from non-magnetic metal improves the injection of current into the strata and allows measurement of small external magnetic fields from within the string. It has been found that the injection of a current as small as 50 milliamps into the surrounding strata provides sufficient current flow to permit magnetic field measurements within about 10 feet of the target well. By using alternating current fields, the effects of the earth's magnetic field on the sensor and on the target well casing are reduced, further increasing the accuracy of the measurement. The accuracy of the system is further improved by the fact that the sensor is located very close to the end of the drill string, generally within about the length of a single 30 foot subsection, so that even if some current from electrode 42 remains in the drill string, only that amount which will be injected into the surrounding strata by that 30 foot subsection will flow over the sensor, and this will be only a small percentage of the total current flow from the electrode, particularly when the electrode is 70-150 feet away from the sensor.

A modification of the foregiong system is illustrated in FIG. 4, to which reference is now made, and wherein elements similar to those of the embodiment of FIG. 1 are similarly numbered. Thus, relief well 14 is drilled from a wellhead 16 to intercept, or to avoid, target well 10. Drill string 20 extends into the well 14 and carries at its lowermost end a bent sub 30 and drill bit 32. Mounted in the drill string is the logging apparatus of the invention, including an injector electrode 42, a sensor tool 44, and an interconnecting bridle cable 60.

The logging apparatus further includes, in accordance with the embodiment of FIG. 4, a second electrode 80 secured in the drill string at a location above the electrode 42. A source of electrical power such as a battery pack (not shown) or a mud turbine 82 driving an electrical generator 84 is connected between the electrodes 42 and 80 by way of cables 86 and 88. The generator or battery pack includes an inverter in conventional manner to provide laternating current of the desired frequency, preferably a relatively low frequency, thereby eliminating the need for a wireline leading to the surface. Electrode 80 serves as a return electrode for current which is injected into the strata 46 by electrode 42 in the manner previously discussed, the current flowing outwardly from the drill string and up through the strata in the manner generally indicated by the current lines 90.

Electrode 80 preferably is axially secured within the drill string 20 by means of spacer arms 92 which may be secured in any suitable manner to the interior surface of a collar 22. The spacer arms may be electrically conductive, and may include pads 94 affixed as by welding to the collar 22, thereby insuring a good electrical contact with the collar. The spacer arms 92, as well as arms 54 and 64 are so arranged as not to impede the flow of drilling mud through the interior of the drill string 20.

In the absence of a wire line to the surface, signals representing magnetic field measurements made by the sensor tool 44 are sent to the surface by any suitable means, such as by way of pressure pulses produced in the drilling mud. Such pressure pulses may be generated by a pulsing unit of the type described in U.S. Pat. No. 4,021,774 of Asmundsson et al. Such a unit is not illustrated herein for the sake of clarity.

The subsections 22 of the drill string adjacent and between the two electrodes 42 and 80 preferably are of stainless steel or like material of relatively high electrical resistance so that the drill string does not act as a short circuit. The electrodes preferably are spaced apart by an amount sufficient to insure that a substantial portion of the current is injected into the surrounding strata, but even if only about 50 milliamps of current are injected, that is sufficient to produce in the target 10 a current which will generate a measurable magnetic field reading at the sensor 44, when the relief well is within about 10 feet of the target.

Preferably, the electrodes 80 and 42 are spaced apart about 300 feet, with the sensor 44 being about 80 feet below the electrode 42 so these two elements can be mounted in a single string section. As before, the sensor is locked into a known angular position with respect to the bent sub 30 to provide accurate directional control of drilling.

The use of the logging assembly of FIG. 4 is similar to that of the assembly of FIG. 1. In both cases, as the relief well approaches the target, the sensor is initially affected mostly by alternating magnetic fields produced by stray currents in the drill string. Gradually, the effect of current flow in the target predominates to permit accurate determination of the target location with respect to the location of the sensor in the relief well. The exact distance at which the measurement while drilling apparatus of the invention can accurately detect the target is a function of the spacing between the electrodes and the sensor, the nature of the conductive material in the target, the nature of the intervening strata, and like variables.

Thus, there has been disclosed a new and novel logging apparatus which is capable of measuring with a high degree of accuracy from within a drill string, the magnetic field produced by current flow in various electrically conductive targets, such as well casings. Although the invention is described in terms of preferred embodiments, it is desired that the true spirit and scope of the invention not be limited thereto, but only by the following claims:

What is claimed is:

1. The method of measuring while drilling the magnetic fields produced by a current flowing in or around an electrically contrasting target to permit continuous determination of the location of the target with respect to a deep well being drilled, comprising:
    securing a magnetic field sensor within a non-magnetic drill string section forming a part of, and located near the bottom of, a drill string;
    aligning the sensor with respect to a drill bit in said drill string;
    positioning an electrode within said drill string, said electrode being spaced above said sensor section;
    supplying alternating current to said electrode;
    causing said alternating current to flow from said electrode into said drill string; said drill string being sufficiently electrically resistive to cause said alternating current to be injected into the earth surrounding the well being drilled, thereby to produce an alternating current flow in said earth, said earth current flow being substantially uniformly distributed around said drill string but being distorted by targets of contrasting electrical conductivity located in said earth, said targets causing a perterbation of the alternating electrical current flow;
    measuring with said sensor the alternating magnetic field produced in the earth by said alternating current flow whereby the distance and direction of said target from said sensor can be determined.

2. The method of claim 1, wherein the step of supplying alternating current to said electrode includes connecting a power supply between said electrode and a ground electrode located at the surface of the earth.

3. The method of claim 1, wherein the step of supplying alternating current to said electrode includes connecting a power supply between said electrode and a ground electrode secured within a second drill string section forming a part of said drill string and spaced above the first electrode.

4. The method of claim 1, wherein the step of injecting alternating current into the earth surrounding the well includes forming at least a portion of the drill string between said electrode and said sensor section of nonmagnetic metal of relatively high electrical resistance whereby substantially all of the alternating current flowing in said drill string is injected into the surrounding earth before it reaches said sensor section.

5. The method of claim 1, wherein the step of securing said sensor in a sensor section includes mounting said sensor to be coaxial with said sensor collar, whereby stray magnetic fields due to to current flow in said sensor collar are substantially cancelled at said sensor.

6. The method of claim 1, wherein the step of securing said sensor includes mounting said sensor coaxially in a cylindrical drill string section, said section having a wall of uniform thickness, whereby any current flow in the sensor section is distributed circumferentially so that stray magnetic fields due to current flow in the sensor section are substantially cancelled at said sensor.

7. Logging apparatus for measuring while drilling magnetic fields produced by alternating current flow in an electrically conductive target to permit continuous determination of the location of the target with respect to a deep well being drilled, comprising:
    a magnetic field sensor;
    means for mounting said sensor coaxially within a nonmagnetic section for drill string;
    an electrode;
    means for positioning said electrode within the same drill string in which said sensor is mounted;
    means for supplying alternating current to said electrode for injecting said current into the earth surrounding a well, so that the injected current can be collected in a target of contrasting electrical conductivity to produce a target alternating magnetic field detectable by said sensor.

8. Logging apparatus for measuring while drilling the magnetic fields produced by alternating current flow in target of contrasting electrical conductivity to provide data relating the location of the target with respect to a well being drilled, comprising:
 a drill string carrying a drill bit for drilling a well;
 an electrode section forming a part of said drill string;
 an electrode;
 means positioning said electrode within said electrode section;
 a source of alternating current;
 means supplying said alternating current to said electrode so that said current flows into said drill string and is injected into the earth surrounding said well, said alternating earth current being distributed around said well but being collected by any nearby target of contrasting electrical conductivity to produce a perterbed electricurrent flow;
 a nonmagnetic sensor section forming a part of said drill string and being spaced below said electrode section;
 magnetic field sensor means;
 mounting means locating said sensor means within said sensor section, said sensor being responsive to measure the alternating target magnetic field produced by said perterbed current flow, whereby the distance and direction of said target with respect to said sensor can be determined.

9. The logging apparatus of claim 8, wherein said sensor section is located near the bottom of said drill string, and is adjacent drill bit.

10. The logging apparatus of claim 9, wherein said sensor means is coaxially mounted within said sensor section and aligned with said drill string, whereby the orientation of said drill bit with respect to said sensor is fixed.

11. The logging apparatus of claim 8, wherein said sensor section and electrode collar are sufficiently spaced that substantially all of said current flowing in said drill string is injected into the earth before reaching said sensor section.

12. The logging apparatus of claim 8, wherein at least a portion of said drill string between said electrode collar and said sensor section is electrically resistive, whereby said alternating current is injected from said drill string into the surrounding earth.

13. The logging apparatus of claim 12, wherein said resistive portion of said drill string is stainless steel.

14. The logging apparatus of claim 8, wherein said sensor section is stainless steel.

15. The logging apparatus of claim 8, wherein said sensor section is located near the bottom of said drill string and said sensor means is coaxially mounted therewithin, and wherein said sensor section has walls of substantially uniform thickness to distribute stray electrical currents around the circumference thereof so that any magnetic fields produced by said stray currents tent to be cancelled at said sensor means.

16. The logging apparatus of claim 15, wherein said sensor section and said electrode section are spaced sufficiently far apart along said drill string that substantially all of said alternating current is injected into the earth, so that any stray magnetic field produced within said drill string by said alternating current in the region of said sensor is sufficiently small to permit detection by said sensor of target magnetic fields due to alternating current collected in said target.

17. The logging apparatus of claim 16, wherein said perterbed alternating current flow is sufficiently large to permit detection by said sensor at a distance of up to about ten feet.

18. The logging apparatus of claim 15, further including a second electrode, said source of alternating current being connected between said electrodes.

19. The logging apparatus of claim 18, wherein said second electrode is located at the surface of the earth.

20. The logging apparatus of claim 18, wherein said second electrode is located within said drill string.

21. The logging apparatus of claim 18, wherein said second electrode is located within and electrically connected to a second electrode drill string section spaced above said first-mentioned electrode section.

22. The logging apparatus of claim 21, wherein said electrode sections are spaced apart by about 300 feet.

23. The logging apparatus of claim 22, wherein the lowermost of said electrode sections is spaced approximately 80 feet above said sensor electrode.

* * * * *